Nov. 21, 1967     F. C. HITZEROTH     3,353,573
PORTABLE POWER TOOL
Filed May 19, 1965     2 Sheets-Sheet 1
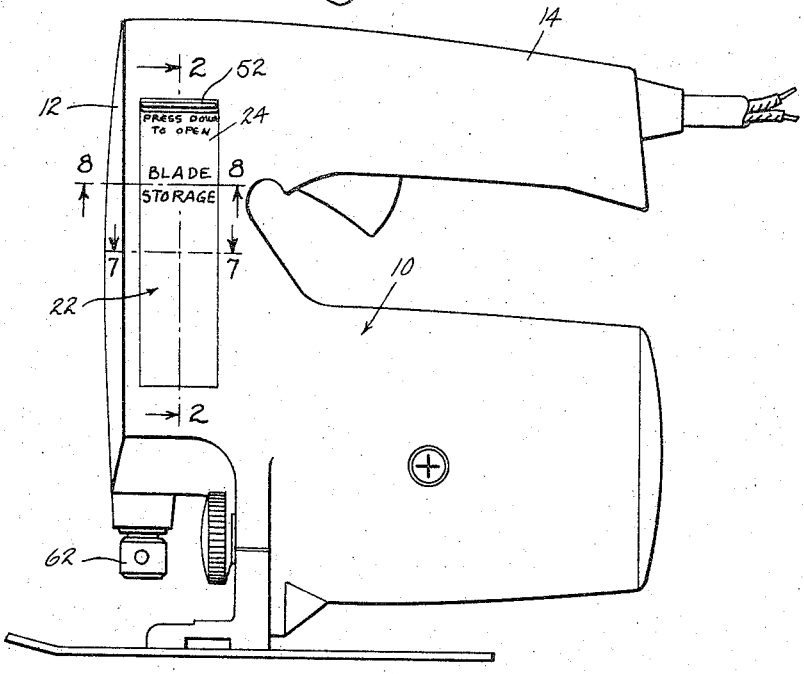
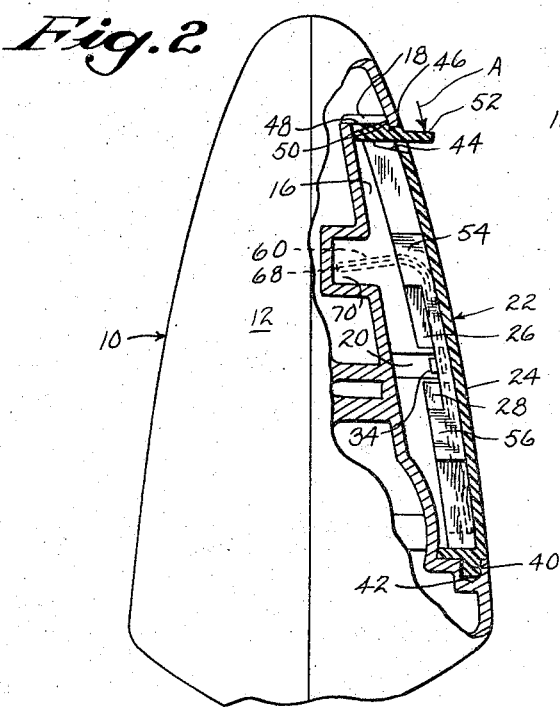
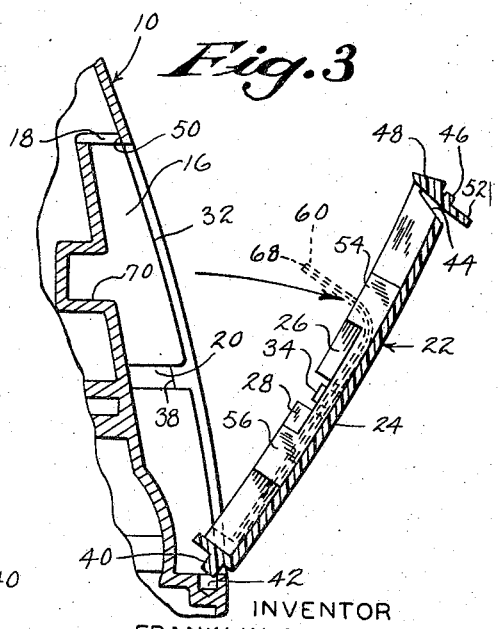
INVENTOR
FRANKLIN C. HITZEROTH
ATTORNEY Nov. 21, 1967  F. C. HITZEROTH  3,353,573
PORTABLE POWER TOOL
Filed May 19, 1965  2 Sheets-Sheet 2
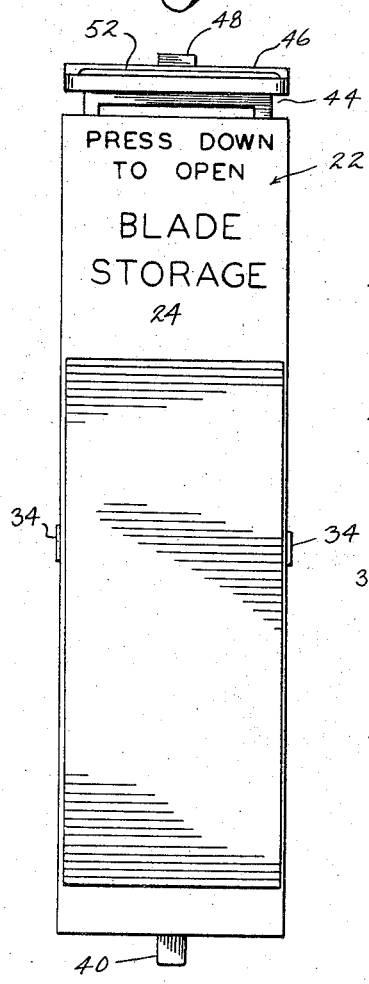
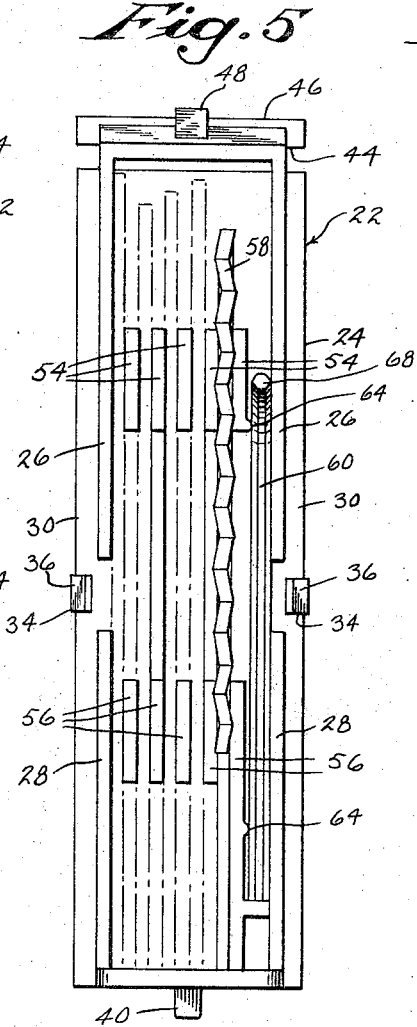
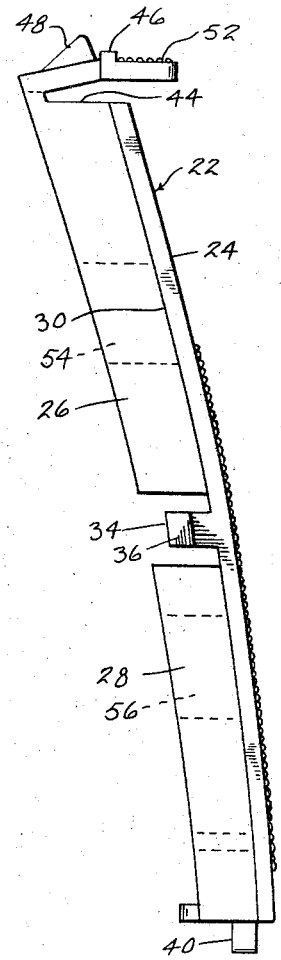
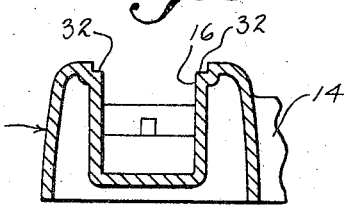
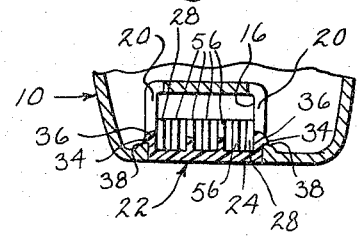
INVENTOR
FRANKLIN C. HITZEROTH
BY
ATTORNEY

United States Patent Office 3,353,573
Patented Nov. 21, 1967

3,353,573
PORTABLE POWER TOOL
Franklin C. Hitzeroth, Elgin, Ill., assignor to McGraw-Edison Company, Milwaukee, Wis., a corporation of Delaware
Filed May 19, 1965, Ser. No. 456,957
4 Claims. (Cl. 143—68)

ABSTRACT OF THE DISCLOSURE

A portable power tool having a recess formed in its housing, and a cover member that fits within the recess and is removably secured to the housing and that is adapted to hold the tool elements used with the power tool.

---

This invention relates to power tools and, more specifically, to an improved housing for power tools using alternative tool elements.

The present invention is directed to a storage chamber associated with a portable power tool housing in which is afforded interchangeable tool elements for different usages of the power tool or different materials with respect to which power tool is utilized. In addition to convenient tool element storage for maximum tool utility, provision should be made for any special tool required to mount and interchange the tool elements.

The applicant's device further contributes a single unitary structure to furnish the enclosure in cooperation with the portable tool housing and also to supply the means for securing the structure to the housing including manually operable latching elements.

It is an object of this invention to provide storage for alternate tool elements of a portable power tool in convenient association with the power tool housing.

It is a further object of this invention to provide a one-piece cover for the tool element storage for retaining tools and including latching and securing means for releasably attaching the cover to a power tool housing.

These and other objects and advantages of this invention will become apparent from the following description when taken in connection with the accompanying drawings wherein:

FIGURE 1 is a side elevation of a saber saw including a blade storage compartment;

FIGURE 2 is a partial vertical section along line 2—2 of FIGURE 1;

FIGURE 3 is a partial section of FIGURE 2 with the cover member unlatched and turned away from the housing recess;

FIGURE 4 is a front elevation of the blade storage cover shown in FIGURES 1 through 3;

FIGURE 5 is a rear elevation of the blade storage cover of FIGURE 4;

FIGURE 6 is a side elevation of the blade storage cover of FIGURE 4;

FIGURE 7 is a partial section viewed taken along line 7—7 of FIGURE 1; and

FIGURE 8 is a partial section along line 8—8 of FIGURE 1 with the blade storage cover removed.

Referring to FIGURE 1, a saber saw is shown having a housing 10 including an upwardly extending forward post portion 12 and a laterally extending handle 14 projecting rearwardly from the forward post 12. The housing 10 is formed of two aluminum die cast halves which meet along a substantially vertical plane through the longitudinal axis of the unit. In the left side portion of the housing shown in FIGURE 1 is a recess defined by the wall 16 shown in FIGURES 2, 3, 7 and 8. The wall defining the recess is continuous with the exception of an aperture 18 at the upper end and apertures 20 at each side of a midportion.

The blade storage cover 22 shown in FIGURES 4, 5 and 6 is formed of a resilient material such as polypropylene and serves as an integral one-piece structure to not only form the enclosure in cooperation with the housing recess, but also portions that provide latching and detent functions in cooperation with the housing to retain the cover in place within the recess.

The cover 22 has an exterior panel 24 from which projects upper and lower generally U-shaped wall portions 26 and 28 respectively. The vertically extending marginal edge portions 30 of the panel that project beyond the legs of the U-shaped wall portions 26 and 28 provide inner surfaces that abut against the housing shoulder 32 (FIGURE 8) when the cover is positioned within the recess. Between the distal ends of the legs of the wall portions 26 and 28 are a pair of projecting members 34 that present outwardly convex surfaces 36 in the outwardly facing surfaces of each which cooperate with the shoulder 38 of the case to form a detent retaining the midportion of the cover within the recess in proper alignment with the housing exterior surface when the cover is in its normal storage position in the recess. At the lower end of cover 22 is a projection 40 which is received in the cylindrical bore 42 formed in the housing wall.

As seen in FIGURE 6, the cover has grooves 44 at the upper end extending from the front face of the panel portion to form a transversely extending lever member 46 with an upwardly projecting central latch portion 48. In the assembled condition the latch portion 48 of the lever engages the shoulder surface 50 of the housing adjoining the upper aperture 18 to releasably retain the blade storage cover in the assembled condition within the housing recess. The handle 52 projects from the recess in the assembled condition and when depressed, as indicated by the arrow A in FIGURE 2, causing bending of the narrow neck of the material in the bight portion of the groove 44 to effect release of the latching portion 48 from the shoulder 50.

As seen in FIGURE 5, an upper and lower series of spaced parallel wall segments 54 and 56 respectively extend from the front panel rear surface to the same height as the adjoining legs of the U-shaped wall portions 26, 28 and are vertically aligned to provide blade storage spaces therebetween to secure commonly used blade sizes in spaced stored relation from one another as seen by the blade 58 with phantom view representation of adjoining blades. The blades are retained by an interference fit between blade surfaces and the abutting surfaces of wall segments 54, 56.

At the right side of the enclosure defined by the generally U-shaped walls is a space in which an Allen wrench 60 for use in mounting the blades in the tool holder 62 of the saw is retained. The wrench 60 is retained by a pair of protuberances 64 which cause an interference fit with the adjoining surfaces of the wrench. Since the Allen wrench turned portion 68 extends inwardly from the cover member, a deeper recess portion 70 is provided to accommodate the projecting end of the wrench.

The cover 22 is inserted into the recess defined by wall portion 16 by inserting the projection 40 into the recess 42 while the cover is inclined with respect to the tool housing 10 and thereafter pivoting the cover to a position where the exterior surface thereof is flush with the adjoining housing surfaces. The projecting portions 34 and the narrow section at the apex of groove 44 will bend to permit the convex surfaces 36 and latch portion 48 to respectively engage the shoulders adjacent apertures 20 and 18.

Although but one embodiment has been shown and described, it will be apparent to those skilled in the art

What is claimed is:

1. In a saber saw, a housing presenting wall portions including a generally upright post with a handle extending therefrom; an elongated recess in the wall portion defining said post; a blade storage cover adapted to be received in said elongated recess, said cover being formed as an integral one-piece structure of resilient material; cooperating readily separable retaining means respectively presented by said wall portion and said cover at one end of said cover when said cover is disposed in said recess; cooperating latch means respectively presented by said cover and said wall portion at the end of said cover opposite said one end when said cover is disposed in said recess, said cooperating latch means being disengaged from one another by bending said cover portion latch means with respect to the major portion of said cover, and a series of spaced projections from the cover on the side thereof adjacent the recess for retaining blades for said saber saw for storage within the recess, said cover being completely separable from the post to provide ready access to the blades outside said recess.

2. The saber saw of claim 1 wherein said cover member latch means comprises a latch lever having an actuating surface and a shoulder for engaging said wall portion cooperating latch means, with said latch lever connected to the balance of said cover by a relatively thin section of material, said thin section being elastically deformable by pressing on said actuating surface to disengage said shoulder from said wall portion.

3. The saber saw of claim 2 wherein said cover presents detent portions at either side thereof intermediate said ends and said wall portion presents cooperating detent means cooperable with said cover member detent portions to retain said cover in said recess with the exterior surface thereof substantially flush with said housing wall portions adjoining said elongated recess.

4. In a portable power tool having a housing presenting a wall portion, a tool element storage compartment comprising an elongated recess in said housing wall portion; a cover member received in said housing wall portion recess to form an enclosure for the storage of tool elements therein; manually operable retaining means for selectively and separably retaining said cover in said recess; and means on the cover member for retaining tool elements for said portable power tool in spaced relation for storage within said enclosure and for access outside said enclosure, said cover member being completely separable from the housing wall portion to provide ready access for the tool elements.

References Cited

UNITED STATES PATENTS

| | | | |
|---|---|---|---|
| 108,596 | 10/1870 | Hundley | 30—125 |
| 2,289,214 | 7/1942 | Schultz | 292—87 X |
| 2,452,148 | 10/1948 | Rhodes | 145—62 X |
| 2,521,473 | 9/1950 | Merisuo | 145—61 X |
| 2,842,260 | 7/1958 | Molitor | 206—17 |
| 2,980,996 | 4/1961 | Beran | 30—125 X |

OTHER REFERENCES

Page 1366, Montgomery Ward 1963 Fall & Winter Catalog.

DONALD R. SCHRAN, *Primary Examiner.*